· US009055164B2

United States Patent
Hasegawa

(10) Patent No.: US 9,055,164 B2
(45) Date of Patent: Jun. 9, 2015

(54) MOBILE TERMINAL DEVICE, TIME CONTROL METHOD, AND TIMER CONTROL PROGRAM

(75) Inventor: Motoyoshi Hasegawa, Saitama (JP)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 1034 days.

(21) Appl. No.: 12/374,946

(22) PCT Filed: Jul. 11, 2007

(86) PCT No.: PCT/JP2007/063798
§ 371 (c)(1),
(2), (4) Date: Jan. 23, 2009

(87) PCT Pub. No.: WO2008/013055
PCT Pub. Date: Jan. 31, 2008

(65) Prior Publication Data
US 2009/0316532 A1  Dec. 24, 2009

(30) Foreign Application Priority Data

Jul. 28, 2006  (JP) ................................. 2006-205540

(51) Int. Cl.
G04F 1/04         (2006.01)
H04M 1/725    (2006.01)
G04F 1/02         (2006.01)
G04C 3/00        (2006.01)
(Continued)

(52) U.S. Cl.
CPC ............. *H04M 1/72544* (2013.01); *G04F 1/02* (2013.01); *G04F 1/04* (2013.01); *G04C 3/002* (2013.01); *G04F 1/005* (2013.01); *G04G 9/02* (2013.01); *H04M 1/72522* (2013.01); *H04M 2250/12* (2013.01)

(58) Field of Classification Search
CPC .......... G04G 13/00; G04G 13/02; G04F 1/00; G04F 1/02
USPC ................. 368/93–95, 184, 187; 340/995.27; 73/1.38
See application file for complete search history.

(56) References Cited

U.S. PATENT DOCUMENTS 4,702,614 A * 10/1987 Copley et al. ................... 368/72
5,339,295 A *  8/1994 Hiromori ....................... 368/108
(Continued)

FOREIGN PATENT DOCUMENTS

DE       203 07 738 U1    8/2003
JP       1983151580 A       9/1983
(Continued)

OTHER PUBLICATIONS

International Search Report of PCT Application No. PCT/JP2007/063798 mailed Oct. 9, 2007.
(Continued)

*Primary Examiner* — Sean Kayes

(57) ABSTRACT

Provided is a mobile terminal device capable of performing, when a user moves the mobile terminal device as if the user operated an hourglass, a screen display and a time measurement accordingly. The mobile phone device 10 comprises a display unit 13, an inclination sensor 20, an hourglass function control unit 31 for measuring a set time and displaying the image of the hourglass on the display unit 13, and an inclination deciding unit 32 for controlling the time measured by the hourglass function control unit 31, on the basis of measured data from the inclination sensor 20.

15 Claims, 7 Drawing Sheets

(51) Int. Cl.
*G04F 1/00* (2006.01)
*G04G 9/02* (2006.01)

(56) References Cited

U.S. PATENT DOCUMENTS

| | | | |
|---|---|---|---|
| 5,898,645 | A | 4/1999 | Sugiyama |
| 5,946,274 | A * | 8/1999 | Yamaguchi et al. ............ 368/67 |
| 6,963,818 | B2 * | 11/2005 | Flentov et al. ................ 702/142 |
| 2004/0201595 | A1 * | 10/2004 | Manchester .................. 345/649 |
| 2005/0276164 | A1 * | 12/2005 | Amron ............................ 368/82 |
| 2006/0052109 | A1 | 3/2006 | Ashman et al. |
| 2007/0275765 | A1 * | 11/2007 | Chao et al. ................... 455/566 |

FOREIGN PATENT DOCUMENTS

| | | |
|---|---|---|
| JP | S58-151580 A | 9/1983 |
| JP | 1985181695 A | 12/1985 |
| JP | S60-181695 U | 12/1985 |
| JP | 2001-136247 A | 5/2001 |
| JP | 2001136247 A | 5/2001 |
| JP | 2004-61441 A | 2/2004 |
| JP | 2004061441 A | 2/2004 |
| JP | 2006-173880 A | 6/2006 |
| JP | 2006173880 A | 6/2006 |
| WO | 2005027364 A1 | 3/2005 |

OTHER PUBLICATIONS

International Preliminary Report on Patentability (PCT/IB/373 and PCT/ISA/237) for PCT Application No. PCT/JP2007/063798 issued on Feb. 3, 2009.
Supplementary European Search Report for EP 07 79 0602 completed Mar. 30, 2012.
International Search Report for PCT/JP2007/063798 mailed Oct. 9, 2007.
International Preliminary Report on Patentability for PCT/JP2007/063798 mailed Feb. 12, 2009.

* cited by examiner

FIG. 3
INCLINATION IN X-AXIS DIRECTION
(0 TO 359 DEGREES)
INCLINATION IN Y-AXIS DIRECTION
(0 TO 359 DEGREES)
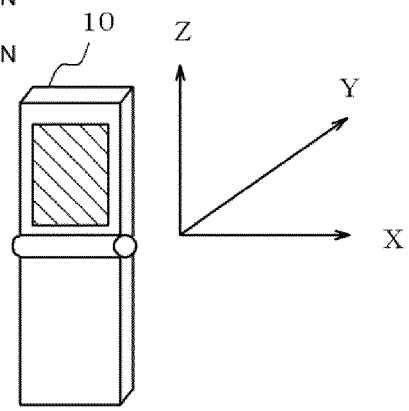
(a)
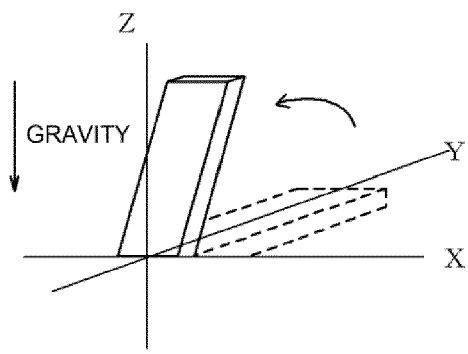
(b)
[PITCH]
INCLINATION OF VERTICAL
DIRECTION OF TERMINAL DEVICE
FROM HORIZONTAL PLANE
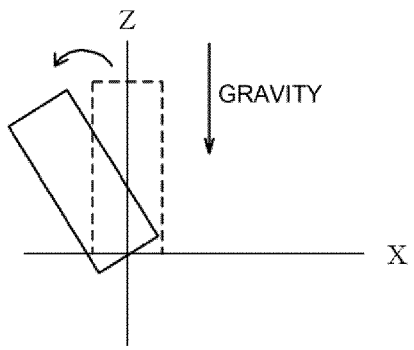
(c)
[ROLL]
INCLINATION OF VERTICAL
DIRECTION OF TERMINAL DEVICE
FROM DIRECTION OF GRAVITY

FIG. 4
(a)
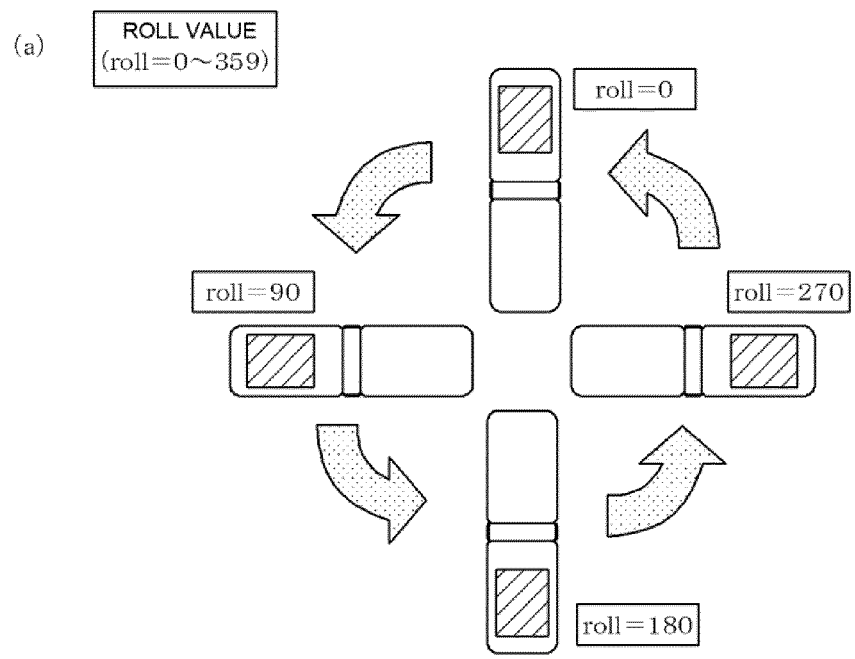
(b)
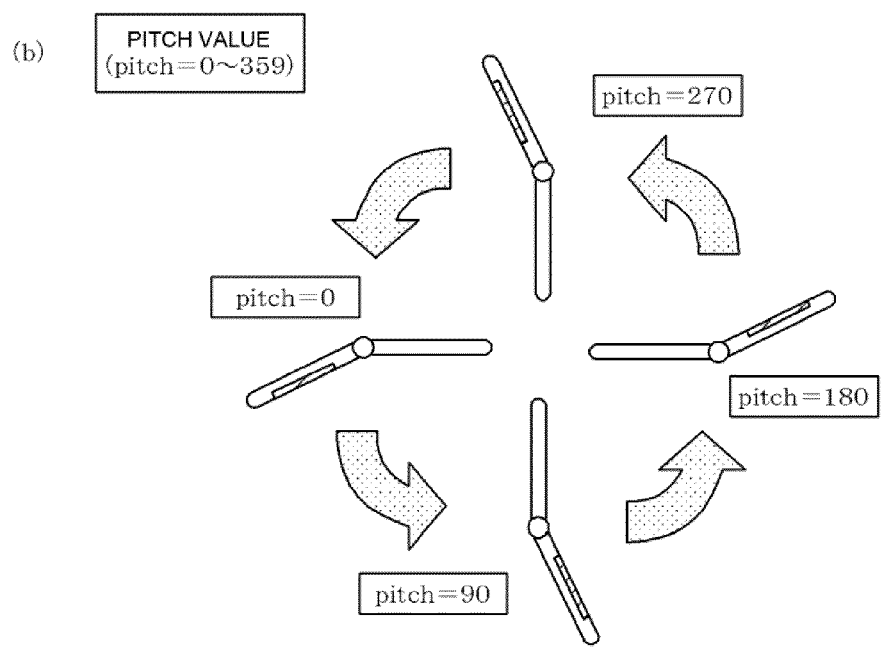

MOBILE TERMINAL DEVICE, TIME CONTROL METHOD, AND TIMER CONTROL PROGRAM

TECHNICAL FIELD

This application is the National Phase of PCT/JP2007/063798, filed Jul. 11, 2007, which is based upon and claims the benefit of the priority of Japanese patent application No. 2006-205540, filed on Jul. 28, 2006, the disclosure of which is incorporated herein in its entirety by reference thereto.

The present invention relates to a mobile terminal device, time control method, and timer control program that provide an hourglass function operating in connection with the inclination of a casing.

BACKGROUND OF THE INVENTION

Most mobile telephones have a timer function. The timer function performs predetermined operations such as measuring a predetermined time period and sounding an alarm after the time period has elapsed. By using the timer function, the measurement of desired time period becomes possible. As methods for displaying the measurement of the elapsed time, for instance, there are a method in which the predetermined time period is displayed first and the display counts down every second until zero is displayed when the time measurement is completed, and conversely, a method in which zero is displayed first and the display counts up every second until the set time is reached when the time measurement is completed. Furthermore, several ways of displaying time, including digital and analog representations or mixture of both, are used. Recently, for the sake of amusement, mobile telephones that display an hourglass have been introduced.

For instance, a mobile telephone that displays an hourglass when it measures time is disclosed in Patent Document 1. This mobile telephone displays an image of the hourglass and call duration time on a display provided on the outer surface of a foldable main body. Both analog and digital representations of the call duration information are displayed. Since the display that displays the image of the hourglass is rotated and becomes upside down when the main body is unfolded along a hinge of the main body, the image of the hourglass is displayed in a first direction when the main body is folded and the image is displayed in the direction 180 degrees rotated against the first direction when the main body is unfolded.

[Patent Document 1]
Japanese Patent Kokai Publication No. JP-P2001-136247A

SUMMARY OF THE DISCLOSURE

Problems to be Solved by the Invention

The entire disclosure of Patent Document 1 is incorporated herein by reference thereto. The following analyses are given by the present invention.

In the conventional mobile telephones, when a desired time period is measured and an hourglass is displayed on the screen, the simulation of the hourglass such as the motion of the sand falling from the upper compartment into the lower compartment as time elapses has been achieved by simply displaying the GIF (Graphics Interchange Format) or FLASH images on the screen. Further, the mobile telephone device described in Patent Document 1 rotates the image displayed by 180 degree when the main body is folded or unfolded so that the image of the hourglass displayed does not become upside down, however, unlike hourglasses in real life, the act of rotating the image does not start the measurement of time. In other words, the act of rotating the image is not linked to the measurement of time. Therefore, there has been a problem that a desired time period cannot be measured by operating a mobile terminal device as if to operate a real hourglass.

The present invention is directed to solve the problem described above, and its object is to provide a mobile terminal device, time control method, and timer control program capable of displaying corresponding images and performing a time measurement accordingly when a user moves the mobile terminal device as if to operate an hourglass.

Means to Solve the Problems

A mobile terminal device according to a configuration of the present invention comprises a display unit, an inclination sensor, a timer unit that measures a set time and displays a state of a time measurement on the display unit, and a timer control unit that controls the time measured by the timer unit based on measured data from the inclination sensor. Further, the inclination sensor may measure the amount of inclination from the direction of gravity and the amount of inclination from a horizontal plane.

It is preferable that the timer control unit cause (instruct) the timer unit to start measuring time when the amount of inclination from the direction of gravity, measured by the inclination sensor, meets a predetermined condition. Further, the timer control unit may cause (instruct) the timer unit to start measuring time when the timer control unit detects that the mobile terminal device has been turned upside down and further returned to the original position, based on the amount of inclination from the direction of gravity measured by the inclination sensor. The timer control unit may cause (instruct) the timer to reset and restart when the amount of inclination from the direction of gravity measured by the inclination sensor meets a predetermined condition after the timer unit has started measuring time. The timer control unit may cause (instruct) the timer to reset and restart when, after the timer unit has started measuring time, the timer control unit detects that the mobile terminal device has been turned upside down and further returned to the original position, based on the amount of inclination from the direction of gravity measured by the inclination sensor. Further, the timer control unit may correct the amount of inclination from the direction of gravity measured by the inclination sensor using the amount of inclination from a horizontal plane. The inclination sensor may measure the amount of inclination from the direction of gravity as roll value and the amount of inclination from a horizontal plane as pitch value, and the timer control unit may correct the roll value to 0 when a pitch value is smaller than 36 or greater than 324, or greater than 144 but smaller than 216. Further, the state of a time measurement may be displayed using an image of an hourglass.

A time control method according to a configuration of the present invention measures the degree of inclination using an inclination sensor and controls a time measured by a timer unit according to the degree of inclination.

It is preferable that the inclination sensor measure the amount of inclination from the direction of gravity and the amount of inclination from a horizontal plane. It is preferable that the timer unit be caused (instructed) to start measuring time when the amount of inclination from the direction of gravity, measured by the inclination sensor, meets a predetermined condition. It is preferable that the timer unit be caused (instructed) to start measuring time when it is detected that a device has been turned upside down and further returned to the original position, based on the amount of inclination from the direction of gravity measured by the inclination sensor. It is preferable that the timer be caused (instructed) to reset and restart when the amount of inclination from the direction of gravity measured by the inclination sensor meets a predetermined condition after the timer unit has started measuring time. It is preferable that the timer unit be instructed to reset and restart when, after the timer unit has started measuring time, it is detected that a device has been turned upside down and further returned to the original position, based on the amount of inclination from the direction of gravity measured by the inclination sensor. It is preferable that the amount of inclination from the direction of gravity measured by the inclination sensor be corrected by the amount of inclination from a horizontal plane. It is preferable that the inclination sensor measure the degree of inclination of a mobile terminal device. It is preferable that a state of a time measurement be displayed on a display unit of the mobile terminal device.

A timer control program according to a configuration of the present invention has a mobile terminal device execute a timer function that measures a set time and displays a state of a time measurement on a provided display unit and a timer control function that controls the time measured by the timer unit based on measured data from an inclination sensor.

Meritorious Effects of the Invention

According to the present invention, since a mobile terminal device comprises a timer control unit that controls the time measured by a timer unit based on measured data from an inclination sensor, when a user moves the mobile terminal device as if he were operating an hourglass in real life, corresponding screen images are displayed and a time measurement is performed accordingly.

BRIEF DESCRIPTIONS OF THE DRAWINGS

FIG. 3 is a drawing for explaining the inclination of the mobile phone device according to Example 1; (a) shows axial directions of an inclination sensor built into the mobile phone device, and (b) and (c) show the definitions of the inclination of the mobile phone device.

FIG. 4 shows an example of roll and pitch values measured by an inclination sensor; (a) is a drawing for explaining the roll value and (b) is a drawing for explaining the pitch value.

EXPLANATIONS OF SYMBOLS

Figure 1:
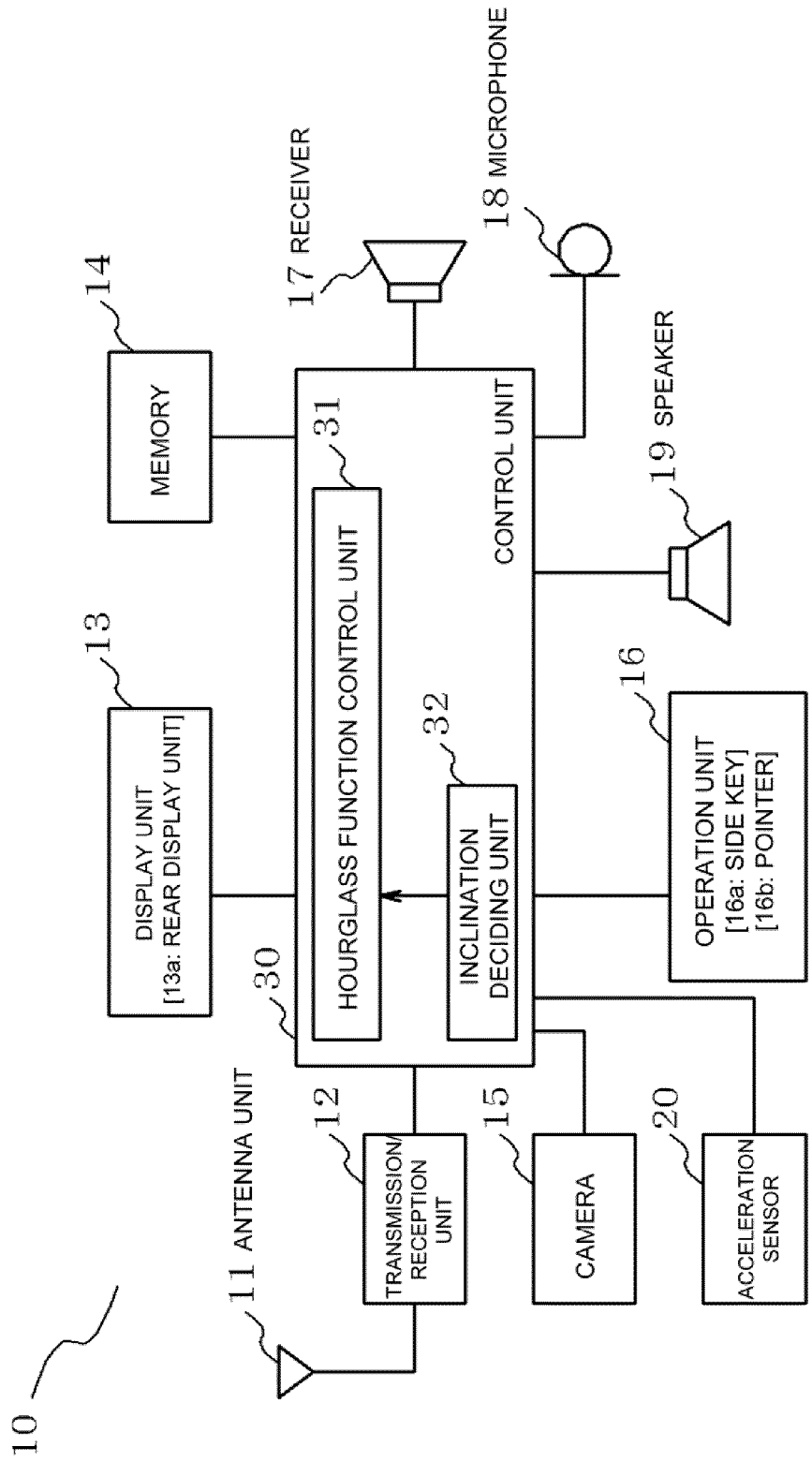
FIG. 1 is a block diagram showing the configuration of a mobile phone device according to Example 1 of the present invention.

10: mobile phone device
11: antenna unit
12: transmission/reception unit
13: display unit
14: memory
15: camera
16: operation unit
17: receiver
18: microphone
19: speaker
20: inclination sensor
30: control unit
31: hourglass function control unit
32: inclination deciding unit

PREFERRED MODES FOR CARRYING OUT THE INVENTION

Figure 2:
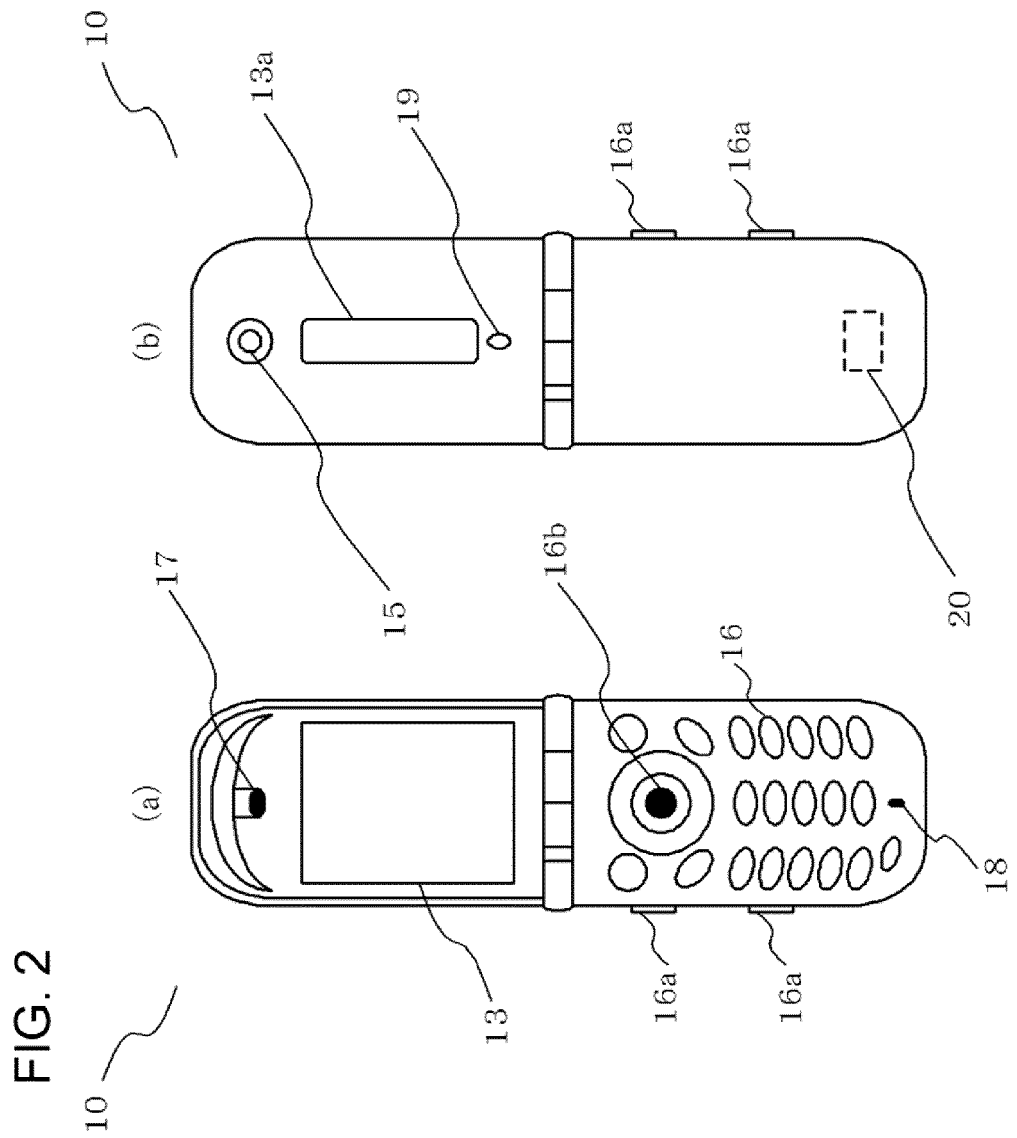
FIG. 2 is an external view of the mobile phone device according to the same example; (a) is a front view and (b) is a rear view.

Next, preferred modes for carrying out the present invention will be described in detail with reference to the drawings. FIG. 1 is a block diagram showing the configuration of a mobile phone device according to Example 1 of the present invention. As shown in the figure, the mobile phone device 10 comprises an antenna unit 11, a transmission/reception unit 12, a display unit 13, a memory 14, a camera 15, an operation unit 16, a receiver 17, a microphone 18, a speaker 19, an inclination sensor 20, and a control unit 30. FIG. 2 is an external view of the mobile phone device 10 according to Example 1 of the present invention. (a) and (b) of FIG. 2 are front and rear views of the mobile phone device 10, respectively. The components also found in FIG. 1 have the same symbols and the explanations of them are omitted.

The antenna unit 11 transmits/receives wireless signals. The transmission/reception unit 12 demodulates a signal received from the antenna unit 11 and modulates a signal outputted to the antenna unit 11. Aside from a front display unit, the display unit 13 includes a rear display unit 13a and displays telephone numbers, a clock, whether the phone is in or out of the service zone, an address book, a schedule, a calendar, a function menu, and the current mode that the phone is in. The memory 14 stores the schedule, the address book, and various application programs and temporarily saves various data. The camera 15 takes still photographs, records videos, and scans barcodes according to the operation by the user. Aside from operation buttons, the operation unit 16 includes side keys 16a and a pointer 16b, and instructs processing according to the operation by the user. The receiver 17 functions as a receiver of the mobile phone device 10 and the microphone 18 functions as a transmitter. The speaker 19 outputs ring tones and message tones.

The inclination sensor 20 is built into the mobile phone device 10 and detects the degree of inclination of the mobile phone device 10 against an axial direction. In recent years, an increasing number of mobile phone devices have a GPS (Global Positioning System) function and mobile phone devices having the GPS function normally comprise an inclination sensor. It is necessary to have the inclination sensor to determine the moving direction of the mobile phone device and the sensor is also used for correcting map errors. As shown in FIG. 2 (b), the inclination sensor 20, for instance, is built into a circuit substrate (not shown in the drawing) inside the lower body of the mobile phone device 10.

The control unit 30 is a circuit that controls the functions and operation of the mobile phone device 10 and comprises an hourglass function control unit 31 and an inclination deciding unit 32. The control unit 30 has many functions, however, only those relating to the present invention will be described.

The mobile phone device 10 has an hourglass function. The hourglass function is a timer function in which the user can start, reset, or restart the measurement of desired time periods by turning the main body of the mobile phone device 10 upside down and flippingly returning (flipping back) it again to the original position as if the user were operating an hourglass. A timer control program realizes this hourglass function by measuring a set time and having the mobile phone device 10 execute a timer function that displays a current state of the time measurement on the provided display unit and a timer control function that controls the time measured by a timer unit based on measured data from the inclination sensor. This timer control program is stored in the memory 14. The hourglass function control unit 31 starts the hourglass function and controls the time measured according to this program. For instance, the hourglass function control unit 31 comprises the timer unit (not shown in the drawing) that measures a set time and displays a current state of the time measurement on the display unit and a timer control unit (not shown in the drawing) that controls the time measured by the timer unit based on the measured data from the inclination sensor. The inclination deciding unit 32 instructs the hourglass function control unit 31 according to data indicating the inclination degree of the mobile phone device 10 obtained from the inclination sensor 20.

Next, the operation of the inclination sensor 20 will be described. The inclination sensor 20 is able to detect the inclination of the mobile phone device 10 from a horizontal plane or from the direction of gravity. FIG. 3 is a drawing for explaining the inclination of the mobile phone device 10. (a) of FIG. 3 shows the axial directions of the inclination sensor 20 built into the mobile phone device 10. As shown in (a) of FIG. 3, in the case where the main body of the mobile phone device 10 is upright perpendicular to the ground, when the vertical axis of the main body is Z-axis, an axis extending from the front of the main body to the rear is Y-axis, and an axis extending from the left of the main body to the right is X-axis, the inclination sensor 20 detects an inclination amount about X-axis and Y-axis.

(b) and (c) of FIG. 3 show a definition of the inclination of the mobile phone device 10. As shown in (b) of FIG. 3, an inclination about X-axis (an inclination in the front/rear direction of the main body), i.e., an inclination of the vertical direction of the mobile phone device 10 from a horizontal plane, is called "pitch." Further, as shown in (c) of FIG. 3, an inclination about Y-axis (an inclination in the left/right direction of the side of the main body), i.e., an inclination of the vertical direction of the mobile phone device 10 from the direction of gravity, is called "roll." The inclination sensor 20 generates inclination data represented by pitch and roll values expressing the amount of inclination of the mobile phone device 10 about X-axis and Y-axis.

FIG. 4 is a drawing showing an example of roll and pitch values measured by the inclination sensor 20; (a) of FIG. 4 explains the roll value and (b) of FIG. 4 explains the pitch value. (a) of FIG. 4 is a front view of the main body, looking at it from the direction of Y-axis shown in (a) of FIG. 3, and the roll value ranges from 0 to 359 according to the inclination amount of the main body around Y-axis. When the lower body, having the inclination sensor 20 built-in, of the mobile phone device 10 is parallel to the direction of gravity and the phone is upright, the roll value is 0. From the state of "roll=0," turning the phone by every 1 degree towards the left away from the direction of gravity increases the roll value each by 1. For instance, from the state of "roll=0," when the phone is rotated by 90 degrees towards the left, the roll value is 90; when the mobile phone device 10 is turned upside down from the state of "roll=0," the roll value is 180; and when the phone is rotated by 270 degrees towards the left from the state of "roll=0," the roll value is 270.

Further, (b) of FIG. 4 is a side view of the main body, looking at it from the direction of X-axis shown in (a) of FIG. 3. As the roll value, the pitch value ranges from 0 to 359 according to the inclination amount of the main body around X-axis. When the lower body, having the inclination sensor 20 built-in, of the mobile phone device 10 is horizontal and the front of the phone faces down, the pitch value is 0. From the state of "pitch=0," rotating the phone forward by 1 degree increases the pitch value by 1. For instance, from the state of "pitch=0," when the phone is rotated by 90 degrees, the pitch value is 90; when the phone is rotated by 180 degrees, the pitch value is 180; and when the phone is rotated by 270 degrees, the pitch value is 270.

The mobile phone device 10 according to the present invention determines the degree of inclination of the main body using the roll value and uses the pitch value to correct the roll value.

The correction of the roll value will be explained. For instance, after starting the timer, the user might want to put the mobile phone device 10 on the horizontal surface. Further, if the mobile phone device is foldable, the lower body is placed on the horizontal surface with the upper body and the lower body opened equal to or more than 90 degrees. When the body part having the inclination sensor 20 built-in is placed on the horizontal surface, since the gravity exerts along the Z-axis direction of the inclination sensor 20 and there is no gravity on the X-Y plane thereof, the operation of the inclination sensor 20 becomes unstable and it might not output accurate roll values. Therefore the roll values are corrected utilizing the pitch values and malfunction is prevented. For instance, after the timer has been started, if any pitch value smaller than 36 or greater than 324 or any pitch value greater than 144 but smaller than 216 is detected, the roll value may always be set to 0, assuming that the user has placed the body part having the inclination sensor 20 built-in on the horizontal surface and is observing the process of the time measurement. Performing such a correction will prevent malfunction in a state in which the roll value cannot be stably detected.

Figure 5:
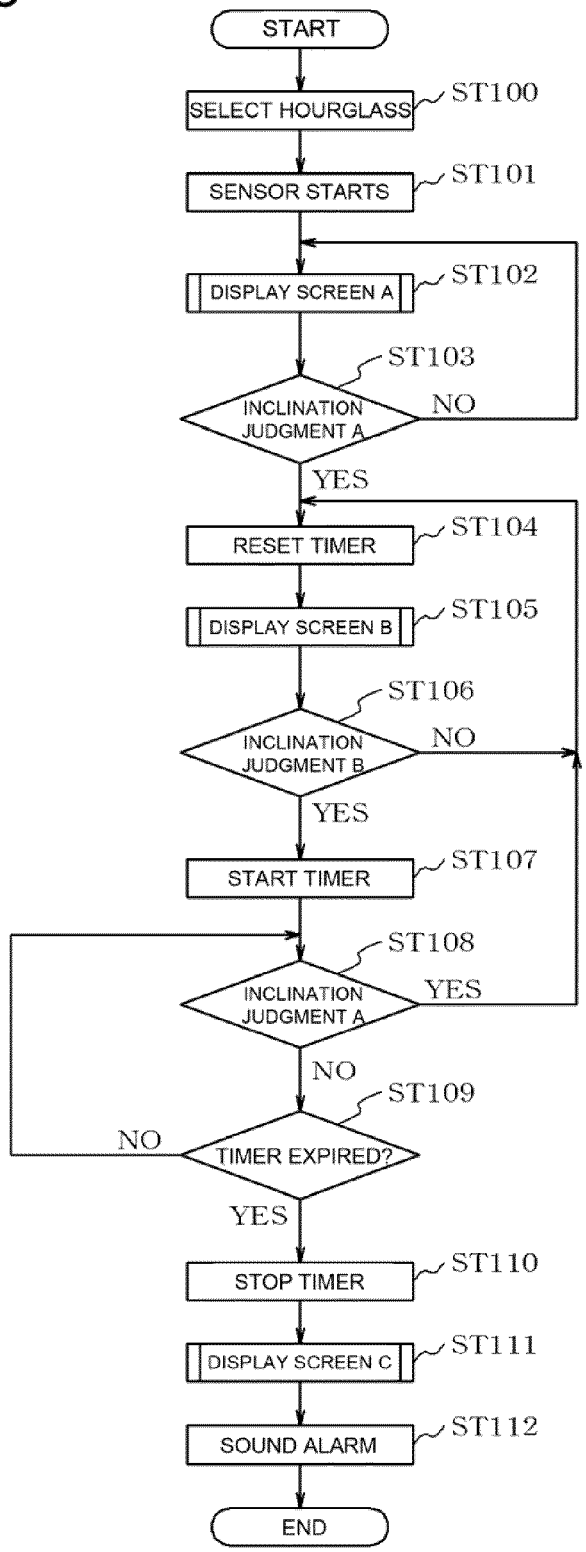
FIG. 5 is a flowchart showing an operation of a controller in the mobile phone device according to Example 1 of the present invention.
Figure 6:
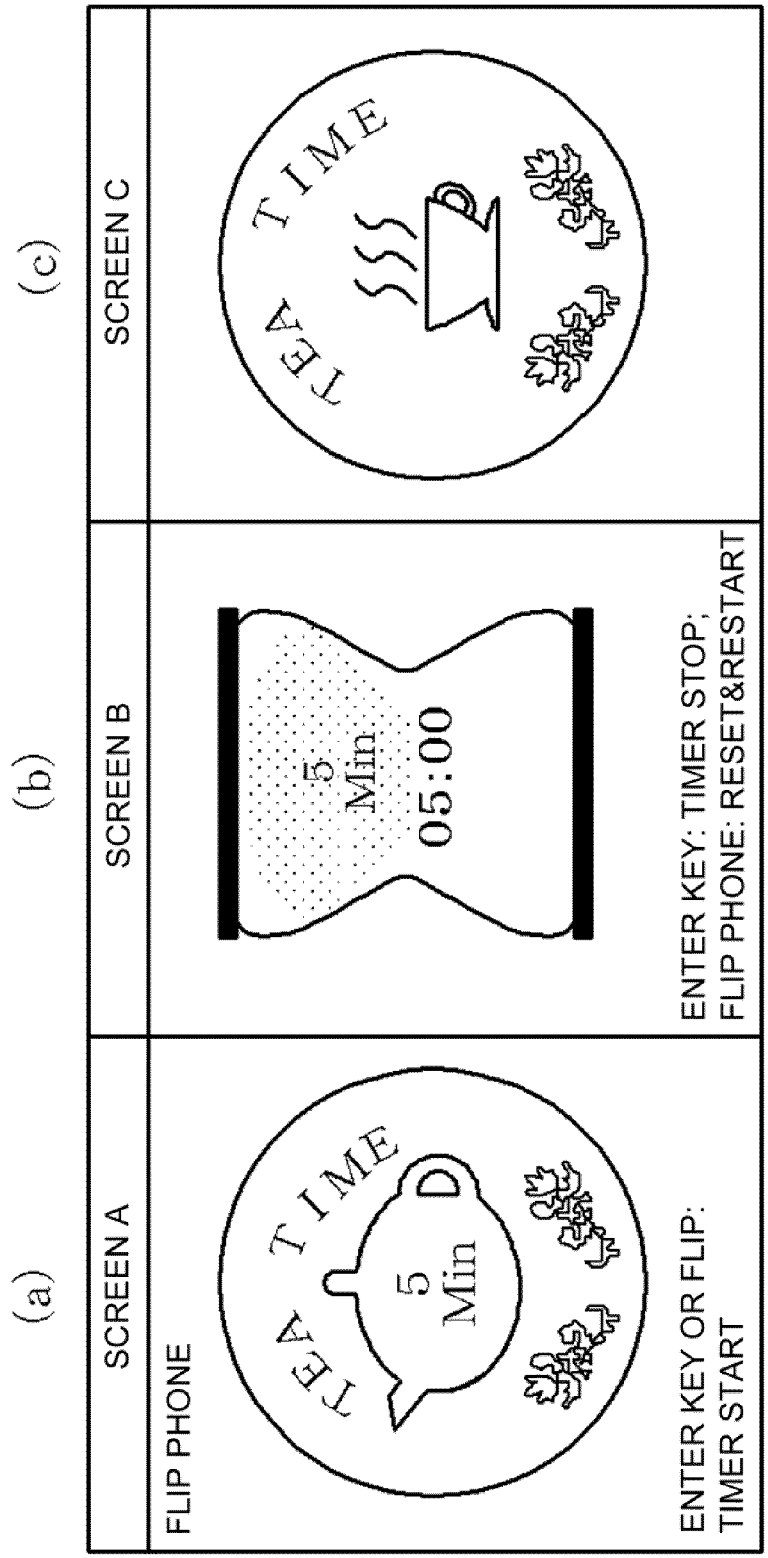
FIG. 6 is a drawing for explaining screen examples displayed on a display unit of the mobile phone device according to Example 1.
Figure 7:
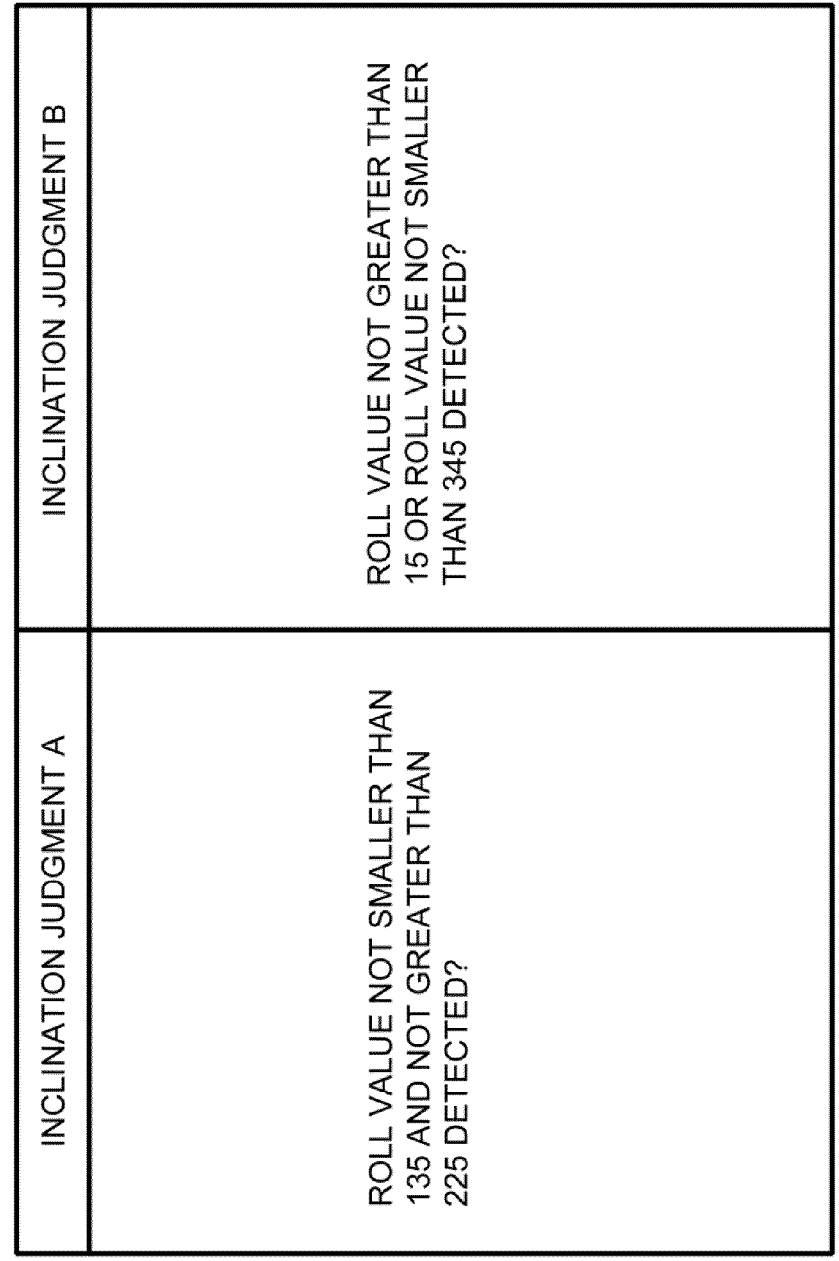
FIG. 7 is a drawing for explaining conditions determining the inclination of the mobile phone device according to Example 1.

FIG. 5 is a flowchart showing the operation of the control unit 30 that realizes the hourglass function of the mobile phone device 10 according to the present invention. Further, FIG. 6 is a drawing for explaining screen examples displayed on the display unit 13 of the mobile phone device 10, and FIG. 7 is a drawing for explaining conditions determining the inclination of the mobile phone device 10. Referring to FIGS. 5 to 7, the operation of the control unit 30 in the mobile phone device 10 will be described.

The user operates the operation unit 16 and selects the hourglass function of the mobile phone device 10 (step ST100). Then the hourglass function control unit 31 starts executing the hourglass function according to a program that realizes the hourglass function.

First, the hourglass function control unit 31 starts the inclination sensor 20 (step ST101). Once being activated, the inclination sensor 20 always measures the inclination data including the roll value and the pitch value of the mobile phone device 10 and notifies the results to the inclination deciding unit 32 of the control unit 30. Next, the hourglass function control unit 31 displays a screen A shown in (a) of FIG. 6 on the display unit 13 as an initial screen (step ST102). The screen A displays messages such as "Flip your phone to start timing Tea Time (5 Min)" and "Enter Key or flip: Timer Start." In this case, the mobile phone device 10 is used to time, for instance, 5 minutes of tea brewing time.

While the hourglass function control unit 31 displays the screen A on the display unit 13, the inclination deciding unit 32 performs inclination judgment A based on the roll value from the inclination sensor 20 (step ST103). (a) of FIG. 7 shows the condition for the inclination judgment A. In the inclination judgment A, whether or not any roll value not smaller than 135 and not greater than 255 is detected is determined. This determines whether or not the mobile phone device 10 is turned upside down from the state of "roll=0." Until the condition for the inclination judgment A is met, the hourglass function control unit 31 returns to the step ST102 and continues to perform the inclination judgment A.

When the condition for the inclination judgment A is met, the inclination deciding unit 32 instructs the hourglass function control unit 31 to reset the timer (step ST104) and display a screen B on the display unit 13 (step ST105). (b) of FIG. 6 shows the screen B. As shown in the drawing, the screen B displays an hourglass, a set time and messages such as "Enter Key: Timer stop; Flip your phone: Reset & restart" The hourglass function control unit 31 resets the timer, responding to the instruction of the inclination deciding unit 32, and displays the screen B on the display unit 13.

While the hourglass function control unit 31 displays the screen B on the display unit 13, the inclination deciding unit 32 performs inclination judgment B based on the inclination data from the inclination sensor 20 (step ST106). (b) of FIG. 7 shows the condition for the inclination judgment B. In the inclination judgment B, whether or not any roll value not greater than 15 or any roll value not smaller than 345 is detected is determined. This determines whether or not the mobile phone device 10 that has been turned upside down has returned to the original position. Until the condition for the inclination judgment B is met, the hourglass function control unit 31 returns to the step ST104 and continues to perform the inclination judgment B.

When the condition for the inclination judgment B is met, the inclination deciding unit 32 instructs the hourglass function control unit 31 to start the timer (step ST107). The hourglass function control unit 31 starts the countdown of the set time, responding to the instruction. The countdown of the set time and GIF images of the hourglass with the sand falling from the upper compartment into the lower compartment are displayed on the screen B.

Further, in the hourglass function of the mobile phone device 10 according to the present invention, the user can reset and restart the timer by flipping (suddenly inclining) the mobile phone device 10 and returning it to the original position after the timer has started. In order to realize this function, the inclination deciding unit 32 performs the inclination judgment A after the timer has started (step ST108). When the condition for the inclination judgment A is satisfied, the device returns to the step ST104, resetting the displays of the timer and the hourglass, and performs the processings from the step ST105 on. When the condition for the inclination judgment A is not met, the inclination deciding unit 32 does not do anything while the hourglass function control unit 31 continues to count time and determines whether or not the timer has expired (step ST109). Until the timer expires, the inclination deciding unit 32 continues to perform the inclination judgment A.

When the timer expires, the hourglass function control unit 31 stops the timer (step ST110) and displays a screen C, as a screen to show that the time measurement has completed, on the display unit 13 (step ST111). FIG. 6 (c) shows an example of the screen C. The screen C indicates that the tinier has expired. Next, the hourglass function control unit 31 sounds an alarm informing that the timer has expired (step ST112).

It should be noted that the hourglass function control unit 31 may start the timer when it detects that the user has pressed the enter key while the screen A is being displayed and stop the timer when it detects that the user has pressed the enter key while the screen B is being displayed.

Since the mobile phone device 10 of the present example comprises the inclination sensor 20 that detects the inclination of the mobile phone device 10 as the pitch value and the roll value and the inclination deciding unit 32 that controls the time measurement by the timer based on the pitch value and the roll value detected by the inclination sensor 20, when the user moves the mobile phone device 10 as if he were operating an hourglass in real life, corresponding screen images are displayed and a time measurement is performed accordingly and as a result, the mobile phone device 10 having a function closer to a real-life hourglass is provided to enhance amusement for the user.

Although a foldable mobile phone device is shown in FIG. 2 in the present example, the mobile phone device may be straight-type or slide-type. Further, the inclination sensor 20 may be built into the upper body of the mobile phone device 10. Although a mobile phone device is used in the present example, the present invention is not limited to this and may be applied to mobile information terminals such as other mobile communication terminals and personal computers. Moreover, the present invention may be applied to a terminal device having an inclination sensor and comprising only timer and display functions.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

The invention claimed is:

1. A mobile terminal device comprising:
a display unit;
an inclination sensor that outputs an amount of inclination about a Y-axis and an amount of inclination about an X-axis;
a timer unit that measures a set time and displays a state of a time measurement on said display unit; and
a control unit that controls the time measured by said timer unit based on the amount of inclination about the Y-axis,
wherein, while said control unit determines that the mobile terminal device is placed on a horizontal plane based on the amount of inclination about the X-axis, said control unit corrects the amount of the inclination about the Y-axis so that the timer unit continues to measure the set time.

2. The mobile terminal device as defined in claim 1, wherein said control unit instructs said timer unit to start measuring time when the amount of inclination about the Y-axis, measured by said acceleration sensor, meets a predetermined condition.

3. The mobile terminal device as defined in claim 1, wherein said control unit instructs said timer unit to start measuring time when said control unit detects that the mobile terminal device has been turned upside down and further returned to an original position, based on the amount of inclination about the Y-axis by said inclination sensor.

4. The mobile terminal device as defined in claim 1, wherein said control unit instructs said timer unit to reset and restart when the amount of inclination about the Y-axis measured by said inclination sensor meets a predetermined condition after said timer unit has started measuring time.

5. The mobile terminal device as defined in claim 1, wherein said control unit instructs said timer unit to reset and restart when, after said timer unit has started measuring time, said control unit detects that the mobile terminal device has been turned upside down and further returned to the original position, based on the amount of inclination about the Y-axis measured by said inclination sensor.

6. The mobile terminal device as defined in claim 1, wherein said state of a time measurement is displayed using an image of an hourglass.

7. A time control method comprising:
measuring a degree of inclination about a Y-axis and a degree of inclination about an X-axis using an inclination sensor; and
controlling a time measured by a timer unit according to the amount of inclination about the Y-axis, and
wherein, while it is determined that a device including the inclination sensor is placed on a horizontal plane based on the amount of inclination about the X-axis, correcting the amount of inclination about the Y-axis so that said timer unit continues to measure time.

8. The time control method as defined in claim 7, wherein said timer unit is caused to start measuring time when the amount of inclination about the Y-axis, measured by said inclination sensor, meets a predetermined condition.

9. The time control method as defined in claim 7, wherein said timer unit is caused to start measuring time when the measured data from said inclination sensor indicated that the device has been turned upside down and further returned to an original position, based on the amount of inclination about the Y-axis measured by said inclination sensor.

10. The time control method as defined in claim 7, wherein said timer unit is caused to reset and restarted when the amount of inclination about the Y-axis measured by said acceleration sensor meets a predetermined condition after said timer unit has started measuring time.

11. The time control method as defined in claim 7, wherein said timer unit is caused to reset and restarted when the amount of inclination about the Y-axis measured by said acceleration sensor meets a predetermined condition after said timer unit has started measuring time.

12. The time control method as defined in claim 7, wherein the amount of inclination about the Y-axis measured by said inclination sensor is corrected using the amount of inclination about the X-axis.

13. The time control method as defined in claim 7, wherein said inclination sensor measures the degree of inclination of a mobile terminal device.

14. The time control method as defined in claim 7, wherein a state of a time measurement is displayed on a display unit of said mobile terminal device.

15. A timer control program having a mobile terminal device execute:
a timer function that measures a set time and displays a state of a time measurement on a provided display unit; and
a control function that controls the time measured by said timer function based on an amount of inclination about a Y-axis output by an inclination sensor,
wherein, while said control function determines that the mobile terminal device is placed on a horizontal plane based on an amount of inclination about an X-axis output by said inclination sensor, said control function corrects the amount of inclination about the Y-axis so that said timer control function continues to measure the set time.

* * * * *